United States Patent [19]
Gellert

[11] Patent Number: 5,326,251
[45] Date of Patent: Jul. 5, 1994

[54] HEATED INJECTION MOLDING NOZZLE WITH ALTERNATE THERMOCOUPLE BORES

[76] Inventor: Jobst U. Gellert, 7A Prince St., Georgetown, Canada, L7G 2X1

[21] Appl. No.: 161,814

[22] Filed: Dec. 6, 1993

[51] Int. Cl.⁵ .............................................. B29C 45/20
[52] U.S. Cl. .................. 425/549; 264/297.2; 264/328.8; 264/328.15; 425/568; 425/572; 425/588
[58] Field of Search ............... 425/549, 566, 567, 568, 425/570, 572, 588; 264/328.8, 328.9, 328.15, 297.2

[56] References Cited

U.S. PATENT DOCUMENTS 4,768,283  9/1988  Gellert ................................ 425/549
4,981,431  1/1991  Gellert ................................ 425/549

*Primary Examiner*—Tim Heitbrink
*Attorney, Agent, or Firm*—Dalesman & Company

[57] ABSTRACT

A heated injection molding nozzle having a melt channel which branches outwardly to several spaced edge gates. The nozzle has alternate thermocouple element receiving bores spaced longitudinally along a temperature gradient extending between the heating element and the front end of the nozzle. The nozzle facilitates the temperature control of materials having different thermal characteristics. When molding an amorphous material, a temperature somewhat lower than the prescribed operating temperature is desirable so the thermocouple element is mounted in the rearward bore closer to the heating element. If it is critical to maintain the temperature of the melt near the prescribed operating temperature for a material such as a crystalline material, the thermocouple element is received in the forward bore further along the temperature gradient from the heating element.

5 Claims, 2 Drawing Sheets

HEATED INJECTION MOLDING NOZZLE WITH ALTERNATE THERMOCOUPLE BORES

BACKGROUND OF THE INVENTION

This invention relates generally to injection molding and more particularly to a heated nozzle for edge gating having alternate bores to receive a thermocouple element to monitor the operating temperature.

It is well known to monitor the operating temperature by mounting a thermocouple element in a bore extending inwardly near the front end of a heated nozzle. Examples are shown in the applicants' U.S. Pat. Nos. 4,768,283 which issued Sep. 6, 1988, 4,981,431 which issued Jan. 1, 1991, and the applicants' Canadian Patent application Ser. No. 2,101,480 filed Jul. 28, 1993 entitled "Injection Molding Nozzle which Retains a Thermocouple Element." U.S. Pat. No. 4,981,431 shows an edge gated configuration with the thermocouple element bore extending inwardly between the front end of the heating element and the seals extending to the gates. While these previous configurations are satisfactory for many applications, there is a problem that there is a temperature gradient near the front end of the nozzle due to heat loss to the surrounding cooled mold. This is particularly true for edge gating where the front end of the heating element must be spaced far enough from the front end of the nozzle to leave room for the outwardly extending seals. Thus, the accuracy of the measurement of the operating temperature is very dependent upon where the thermocouple element receiving bore is located between the heating element and the front end of the nozzle. The temperature measured by the thermocouple element relative to a temperature setpoint determines how much heat is provided by the heating elements. Thus, erroneous measurement of the operating temperature results in various problems dependent upon the type of material or melt being processed. For instance, if a crystalline material with a narrow temperature window or span between the melting point and processing temperature is being processed and the thermocouple element receiving bore is very close to the heating element, the temperature setpoint has to be well above the operating temperature prescribed for the material to provide sufficient heat to avoid the melt in the melt passage near the gates dropping below the solidification temperature. Conversely, if an amorphous material is being processed and the thermocouple element receiving bore is closer to the front end of the nozzle, the temperature setpoint can be well below the operating temperature prescribed for the material to avoid melt degradation, stringing and slower cycle time due to excessive melt temperatures. This problem of erroneous temperature measurement due to heat loss is exacerbated by the fact that the melt itself generally is a considerably better insulator if it is amorphous rather than crystalline. While an operator can compensate for this problem by adjusting the temperature setpoint higher or lower than the prescribed operating temperature dependent upon the type of material and location of the thermocouple element receiving bore, this has been found to be very confusing due to the fact that a material can only be processed with a temperature setpoint which is outside of the recommended processing temperature range for that material.

SUMMARY OF THE INVENTION

Accordingly, it is an object of the present invention to at least partially overcome the disadvantages of the prior art by providing a heated nozzle having alternate locations for the thermocouple element depending upon the characteristics of the material to be processed.

To this end, in one of its aspects, the invention provides an elongated injection molding nozzle having an outer surface, a rear end, a front end, a melt channel extending therethrough, and a heating element, the melt channel having a central portion extending forwardly from an inlet at the rear end and a plurality of radial portions branching outwardly from the central portion to convey melt to a plurality of edge gates spaced around the outer surface in a common plane a first predetermined distance rearwardly from the front end of the nozzle, the heating element extending around the central portion of the melt channel and being spaced a second predetermined distance rearwardly from the front end of the nozzle, having the improvement wherein first and second thermocouple element receiving bores extend inwardly from the outer surface into the nozzle between the heating element and the front end of the nozzle, the first and second thermocouple element receiving bores being spaced longitudinally a third predetermined distance apart, whereby one of the first and second thermocouple element receiving bores is selected to receive a thermocouple element therein to monitor the operating temperature, the one of the first and second thermocouple element receiving bores selected to receive the thermocouple element being predetermined by the characteristics of the material to be processed.

Further objects and advantages of the invention will appear from the following description taken together with the accompanying drawings.

DETAILED DESCRIPTION OF THE INVENTION

Figure 1:
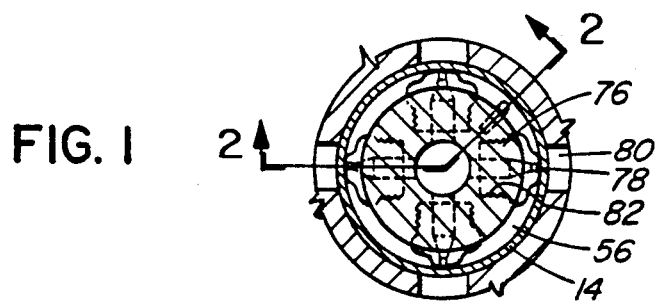
FIG. 1 is a cross sectional view of a nozzle according to a preferred embodiment of the invention seated in a mold.
Figure 2:
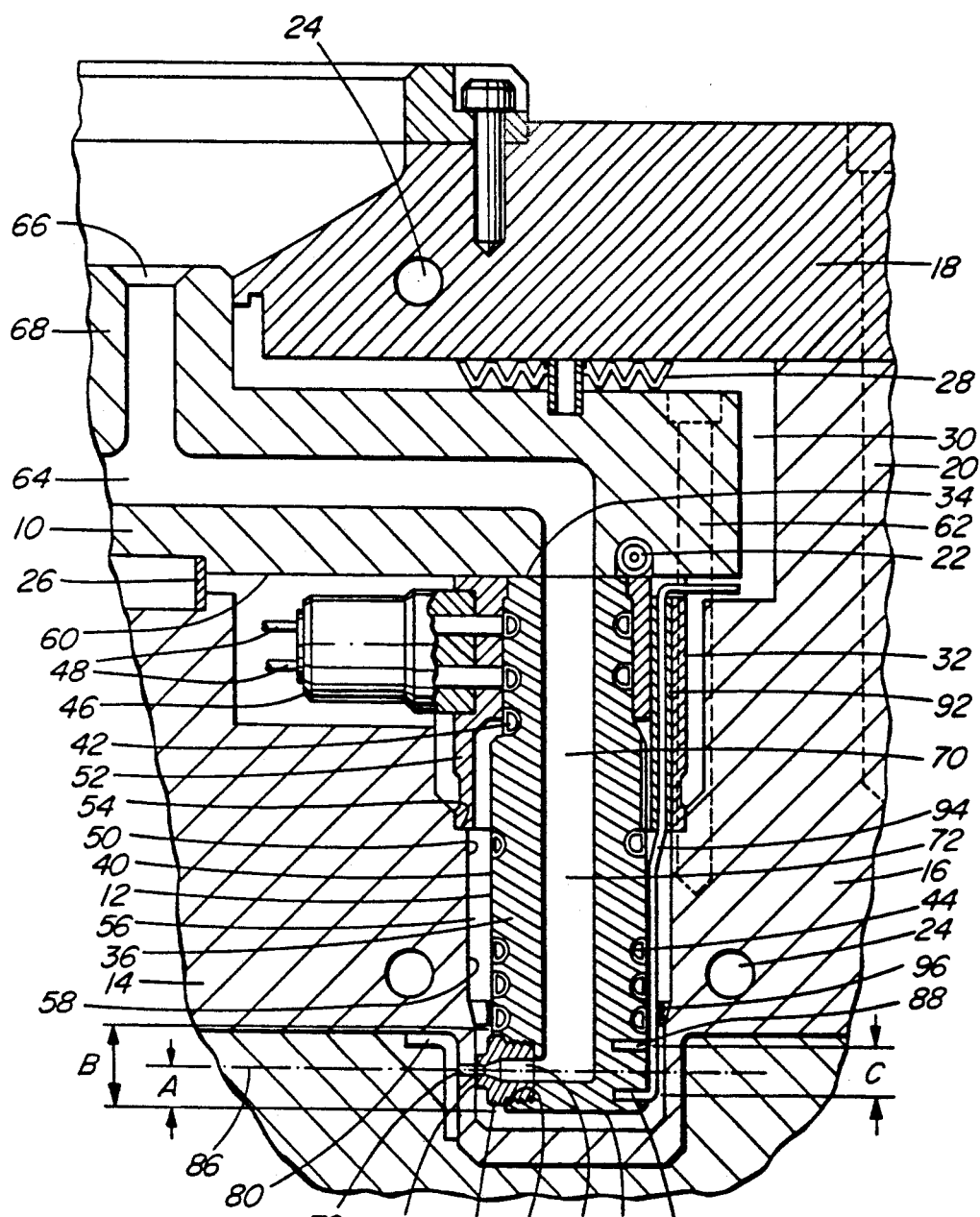
FIG. 2 is a sectional view of a portion of a multi-cavity edge gated injection molding system showing the nozzle along line 2—2 in FIG. 1, with the thermocouple element in one location.

Reference is first made to FIGS. 1 and 2 which show a portion of a multi-cavity injection molding system or apparatus having a melt distribution manifold 10 interconnecting several heated nozzles 12 in a mold 14. While the mold 14 usually has a greater number of plates depending upon the application, in this case only a cavity plate 16 and a back plate 18 which are secured together by bolts 20 are shown for ease of illustration. The melt distribution manifold 10 is heated by an integral electrical heating element 22 and the mold 14 is cooled by pumping cooling water through cooling conduits 24. The melt distribution manifold 10 is mounted between the cavity plate 16 and the back plate 18 by a central locating ring 26 and insulative and resilient spacer members 28 which provide an insulative air space 30 between the heated manifold 10 and the surrounding cooled mold 14.

In this embodiment, each steel nozzle 12 has a rear collar portion 32 adjacent a rear end 34 and a front portion 36 which extends forwardly from the rear collar portion 32 to a front end 38. The front portion 36 has a generally cylindrical outer surface 40 which is smaller in diameter than the rear collar portion 32. The nozzle 12 is heated by an electrical heating element 42 which is integrally brazed in the nozzle 12 with a spiral portion 44 and an external terminal 46 to provide connection to leads 48 from an external power source (not shown). Each nozzle 12 is seated in a well 50 in the cavity plate 16 by a cylindrical insulating and locating flange 52 which extends forwardly from the rear collar portion 32 to sit on a circular shoulder 54 in the well 50. This provides an insulative air space 56 between the outer surface 40 of the front portion 36 of the heated nozzle 12 and the surrounding generally cylindrical inner surface 58 of the well 50 in the cooled mold 14. The nozzles 12 are securely retained in the wells 50 with their rear ends 34 abutting against the front face 60 of the manifold 10 by bolts 62 which extend from the manifold 10 into the cavity plate 16.

A melt passage 64 extends from a central inlet 66 in a cylindrical inlet portion 68 of the manifold 10 and branches outwardly in the manifold 10 into alignment with a melt channel 70 in each of the heated nozzles 12. The melt channel 70 in each of the heated nozzles 12 has a central portion 72 extending forwardly from the rear end 34 and a number of radial portions 74 extending outwardly from the central portion 72. Each of the radial portions 74 of the melt channel 70 extends outwardly through an edge gate seal 76 to an edge gate 78 leading to one of the cavities 80. Each edge gate seal 76 is screwed into a threaded seat 82 extending inwardly from the cylindrical outer surface 40 of the nozzle 12 and extends outwardly across the insulative air space 56 into contact with the inner surface 58 of the well 50. The type of edge gate seal 76 seen in FIGS. 1 and 2 has an outer face 84 which contacts the inner surface 58 of the well 50 immediately around the edge gate 78 leading to the cavity 80. There are a number of aligned edge gate seals 76, edge gates 78, and cavities 80 equally spaced around the cylindrical outer surface 40 of the nozzle 12. The edge gates 78 extend around the nozzle 12 in a common plane 86 spaced a predetermined distance A rearwardly from the front end 38 of the nozzle 12 (FIG. 2).

The spiral portion 44 of the heating element 42 extends around the central portion 66 of the melt passage 64 and is spaced a predetermined distance B rearwardly from the front end 38 of the nozzle 12 to leave sufficient room for the edge gate seals 76. Each nozzle 12 has two thermocouple element receiving bores 88, 90 extending inwardly from the cylindrical outer surface 40 between the spiral portion 44 of the heating element 42 and the front end 38 of the nozzle 12. As seen in FIG. 1, in this embodiment the thermocouple element receiving bores 88, 90 are aligned between two adjacent edge gate seals 76. Also, the thermocouple element receiving bores 88, 90 are shown extending radially inward, but in alternate embodiments they can extend diagonally and do not have to be longitudinally aligned with each other. As clearly seen in FIG. 2, the thermocouple element receiving bores 88, 90 are longitudinally spaced a predetermined distance C apart, and in this embodiment are equally spaced longitudinally on opposite sides of the common plane 86 through the edge gates 78. The nozzle 12 has a hollow thermocouple element tube 92 which extends through the rear collar portion 32 and along the inside of the insulating and locating flange 52. A thermocouple element 94 extends through the thermocouple element tube 92 and the insulative air space 56 around the nozzle 12 and is bent into the forward thermocouple element receiving bore 90 where it is securely retained in place by a high temperature wire 96 wrapped around the outer surface 40 of the nozzle 12.

In use, the injection molding system or apparatus is assembled as shown in FIGS. 1 and 2. Although only a single nozzle 12 is shown for ease of illustration, the melt passage 64 normally branches in the manifold 10 to several nozzles 12, and the melt channel 70 in each nozzle 12 normally branches to four edge gates 78 so there is a large number of cavities 80 depending upon the application. Electrical power is applied to the heating element 22 in the manifold 10 and to the heating elements 42 in the nozzles 12 to heat them to a predetermined operating temperature. Pressurized melt is applied from a molding machine (not shown) to the central inlet 66 of the melt passage 64 according to a predetermined cycle. The melt flows through the melt distribution manifold 10, nozzles 12, and edge gates 78 into the cavities 80. After the cavities 80 are filled and a suitable packing and cooling period has expired, the injection pressure is released and the melt conveying system is decompressed to avoid possible stringing through the open gates 78. The mold 14 is then opened to eject the molded products. After ejection, the mold 14 is closed and the cycle is repeated continuously with a cycle time dependent upon the size of the cavities 80 and the type of material being molded. As can be seen, the thermocouple element 94 extends forwardly through the thermocouple tube 92 and the insulative air space 56 between the outer surface 40 of the front portion 36 of the nozzle 12 and the surrounding inner surface 58 of the well 50 and into the forward bore 90. This bore 90 is forward of the plane 86 on which the edge gates 78 are located and is relatively close to the front end 38 of the nozzle 12. Thus, there is considerably more temperature loss at the forward bore 90 than at the rearward bore 88 so the temperature measured by the thermocouple element 94 is less than the temperature of the melt in the central portion 72 of the melt channel 70. This forward location of the thermocouple element 94 is suitable for crystalline or other materials which have a narrow temperature window or span between the melting point and processing temperature and therefore cannot be injected at a melt temperature below the prescribed operating temperature. As mentioned above, in this arrangement the outer faces 84 of the edge gate seals 76 abut against the inner surface 58 of the well 50 around the edge gates 78 which provides more heat near the gates 78 to avoid the melt temperature dropping below the solidification temperature.

Figure 3:
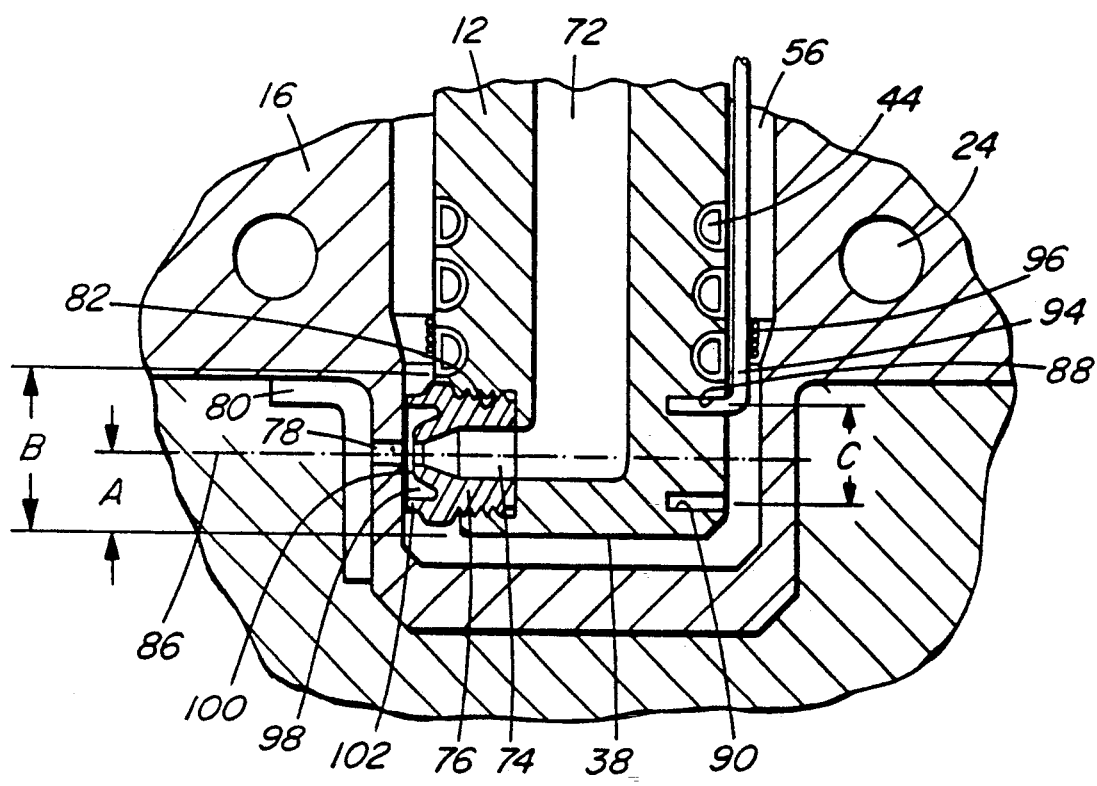
FIG. 3 is a sectional view similar to a portion of FIG. 2 showing a different seal and the thermocouple element in an alternate location.

Reference is now made to FIG. 3 which shows the same nozzle 12 as described above with the thermocouple element 94 received in the rearward bore 88 rather than the forward bore 90. As this bore 88 is rearward of the plane 86 on which the edge gates 78 are located, there is very little temperature loss so the temperature measured by the thermocouple element 94 is very close to the operating temperature of the melt in the central portion 72 of the melt channel 70. There is some temperature loss as the melt flows outwardly through the radial portions 74 of the melt channel so this rearward location of the thermocouple element 94 is suitable for amorphous or other materials which can be injected at a melt temperature somewhat below their prescribed operating temperature. As seen in FIG. 3, the edge gate seals 76 are of a different type to reduce heat loss to the cooled cavity plate 16. Each seal 76 has a space 98 between its outer face 100 and the inner surface 58 of the well 50. This space 98 is surrounded by a circular flange 102 which abuts against the inner surface 58 of the well 50. In use, the space 98 fills with melt which partially solidifies to provide thermal insulation around the gate 78.

This nozzle having two longitudinally spaced thermocouple element bores 88, 90 allows one of them to be selected to receive the thermocouple element 94 to correspond to the thermal characteristics of the material to be processed. If a material such as an amorphous material can be processed at a temperature somewhat lower than the prescribed temperature, it is desirable to do so to reduce degradation and cycle time. Thus, the thermocouple element receiving bore 88 closer to the heating element 42 should be selected to take advantage of the temperature gradient due to heat loss to the cooled mold. On the other hand, the same nozzles 12 can be used by selecting the forward thermocouple element receiving bore 90 further from the heating element 42 to process material such as crystalline materials which have a rapid solidification speed and are more critical to maintain near their prescribed operating temperature.

While the description of the injection molding nozzle according to the invention has been given with respect to a preferred embodiment, it will be evident that various other modifications are possible without departing from the scope of the invention as understood by those skilled in the art and as defined in the following claims.

The embodiments of the invention in which an exclusive property of privilege is claimed is defined as follows:

1. In an elongated injection molding nozzle having an outer surface, a rear end, a front end, a melt channel extending therethrough, and a heating element, the melt channel having a central portion extending forwardly from an inlet at the rear end and a plurality of radial portions branching outwardly from the central portion to convey molten material to a plurality of edge gates spaced around the outer surface in a common plane a first predetermined distance rearwardly from the front end of the nozzle, the heating element extending around the central portion of the melt channel and being spaced a second predetermined distance rearwardly from the front end of the nozzle, having the improvement wherein;

first and second thermocouple element receiving bores extend inwardly from the outer surface into the nozzle between the heating element and the front end of the nozzle, the first and second thermocouple element receiving bores being spaced longitudinally a third predetermined distance apart, whereby one of the first and second thermocouple element receiving bores is selected to receive a thermocouple element therein to monitor the operating temperature of the molten material, the one of the first and second thermocouple element receiving bores selected to receive the thermocouple element being predetermined by the molten material to be processed.

2. An injection molding nozzle as claimed in claim 1 wherein the first and second thermocouple element receiving bores are equally spaced longitudinally on opposite sides of the common plane through the plurality of edge gates.

3. An injection molding nozzle as claimed in claim 2 wherein the first and second thermocouple-element receiving bores are aligned longitudinally.

4. An injection molding nozzle as claimed in claim 3 wherein the first and second thermocouple element receiving bores extend radially inwardly from the outer surface of the nozzle.

5. An injection molding nozzle as claimed in claim 4 wherein each radial portion of the melt channel extends outwardly through a seal mounted in a seat extending inwardly from the outer surface of the nozzle, selected corresponding to the one of the first and second thermocouple element receiving bores selected to receive the thermocouple element.

* * * * *